April 8, 1941.   E. H. LAND   2,237,567

LIGHT POLARIZER AND PROCESS OF MANUFACTURING THE SAME

Filed May 4, 1939

INVENTOR.
Edwin H. Land
BY
Brown & Jones
ATTORNEYS

Patented Apr. 8, 1941

2,237,567

UNITED STATES PATENT OFFICE 2,237,567

LIGHT POLARIZER AND PROCESS OF MANUFACTURING THE SAME

Edwin H. Land, Boston, Mass., assignor to Polaroid Corporation, Dover, Del., a corporation of Delaware Application May 4, 1939, Serial No. 271,815

18 Claims. (Cl. 88—65)

This invention relates to a new and improved light-polarizer and to the process of manufacturing the same.

An object of the invention is to provide a light-polarizer of the character described which may be readily and efficiently manufactured, which shows high transmission properties with respect to one component of an incident beam, and which substantially completely absorbs the other component of such beam.

Other objects of the invention are to provide a polarizer of the character described comprising a sheet or film of a plastic material having elongated, substantially oriented, chain-like molecules; to provide a light-polarizer comprising a sheet or film of polyvinyl alcohol; to provide such a polarizer which has been dyed or stained, and more specifically to provide such a polarizer which has been stained with a water-soluble stain.

Other objects of the invention are to provide processes for the production of a stained or dyed polarizing polyvinyl alcohol sheet or film; to provide a process comprising staining a stretched sheet of polyvinyl alcohol with a water soluble stain comprising iodine and an iodide; to provide a process for setting or fixing the stain and for decreasing its heat sensitivity.

Other objects of the invention will in part be obvious and will in part appear hereinafter.

The invention accordingly comprises the several steps and the relation of one or more of such steps with respect to each of the others, and the article possessing the features, properties, and the relation of elements which are exemplified in the following detailed disclosure, and the scope of the application of which will be indicated in the claims.

Figure 1:
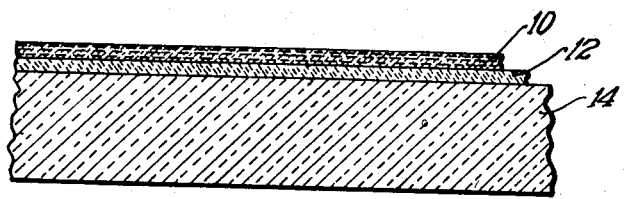
Figure 2:
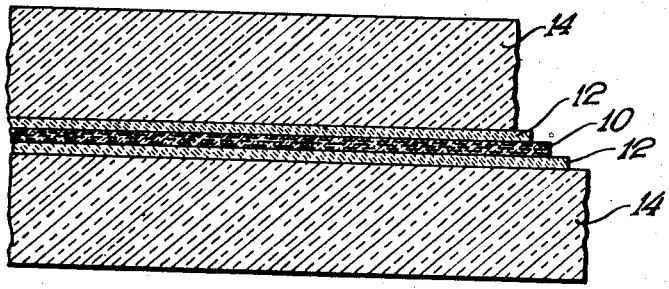

For a fuller understanding of the invention, reference should be had to the accompanying drawing, in which:

Fig. 1 represents diagrammatically and in section one form of the invention; and Fig. 2 is a similar view of a modification of the invention.

In my copending application Serial No. 237,783, filed October 29, 1938, for Light polarizer and process of manufacture, there is disclosed a light-polarizer comprising a dyed or tinted, stretched sheet of plastic material, the sheet having been rendered rubbery-elastic and extended substantially to the limit of extension of its rubbery-elastic state. This application is a continuation in part of my said copending application Serial No. 237,783. It relates to an improved form of light-polarizer of the general type disclosed in said application.

I have found that sheets or films of certain transparent plastic materials having elongated or chain-like molecules may be employed to produce excellent light-polarizers when the sheets have been softened, as for example by heating, stretched to orient their molecules, and then dyed or tinted, preferably with a polarizing polyiodide.

A preferred material for use in the practice of the present invention is polyvinyl alcohol. A cast sheet or film of polyvinyl alcohol is first formed from a solution of the material in water. The dried cast sheet is then heated to a temperature at which it can be extended by stretching. The temperature employed is not critical. It should preferably not exceed a temperature at which the polyvinyl alcohol tends to flow. A suitable temperature is one in the neighborhood of 130° C., although substantially higher temperatures may be employed. The stretching may be accomplished in a moist atmosphere, for example in the presence of steam.

Preferably the sheet is stretched until its molecules are in substantially oriented alignment. The degree of stretch may be varied widely, however, without departing from the invention. Speaking generally, the greater the stretch the more efficient the polarizer produced by following the invention. As the sheet is stretched, its tensile strength across the direction of stretch is steadily diminished, and the degree of stretch to which the sheet is subjected may depend in part at least upon the uses to which the finished polarizer is to be put. If, for example, a highly efficient polarizer is not essential, and if the polarizer is to be subjected to fairly hard usage, the stretching should preferably not continue to a point where the sheet becomes fragile and difficult to handle.

It should be noted, however, that the highly stretched sheet may be coated, as with solutions of incomplete polyvinyl acetal or acrylic acid esters, or it may be bonded to other plastic sheets, such as unstretched polyvinyl alcohol, methyl methacrylate or the like, and thus protected from injury.

Speaking generally, a suitable stretch for ordinary polarizing purposes may be one in which the sheet is extended to from two and one-half to eight times its original length.

The stretched sheet may then be cooled to room temperature and, if necessary, dried, then stained or dyed, preferably with a solution providing a polarizing polyiodide. Such a solution may be formed from one gram of crystalline iodine, four grams of ammonium iodide, 200 c. c. of methanol, and 100 c. c. of water. It is to be understood that these proportions are illustrative and not definitive in any way. It is to be understood also that substances other than those mentioned may be employed. For example, sodium iodide may be substituted for ammonium iodide, or any iodide may be, employed which, when present in the solution with the iodine, results in the formation of a stain in the sheet comprising a polarizing polyiodide.

The stain should preferably be applied in the form of a water solution, for the polyvinyl alcohol is permeable to water but not to most organic solvents. By varying the proportions used, methanol may be omitted.

The solution may be applied to the stretched sheet of polyvinyl alcohol in any of a number of ways. It may be sprayed on to the sheet. The sheet may be passed through the solution, or the solution may be applied to the sheet by moistening a suitable applicator and applying the solution to one or both surfaces of the stretched sheet.

The extinction color of the finished polarizing sheet and its transmission color as well may depend, at least in part, on the amount of stain applied to the sheet and upon the concentration thereof and the ratio of iodide to iodine. Changes in the concentrations and in the dyes or stains employed may be freely made without departing from the invention and for the purpose of controlling the degree of polarization secured and the extinction and transmission colors of the sheet.

It is highly desirable that the stained, stretched sheet be thoroughly and carefully dried. Excess of staining solution should be promptly removed. If heat is employed to dry the sheet care should be taken that temperatures are employed which are not so high as to drive out the stain. Drying should preferably take place initially at a fairly low temperature, for example at about 150° F. The temperature may be increased as drying progresses. The sheet may also be dried by immersion in such organic solvents as acetone or isopropyl alcohol.

It should be understood also that the stretching of the sheet before dyeing should be accomplished under conditions and at temperatures below those at which the polymerization of the sheet progresses rapidly, for otherwise the sheet will not readily take the water soluble stain, as increased polymerization decreases its water permeability. After the sheet has been stained it may be reheated at temperatures below that at which the stain is driven off, and its permeability to water considerably decreased.

Suitable plasticizers may, if desired, be employed with the polyvinyl alcohol in forming the sheet. Glycerine, ethylene glycol and formamid are suitable for this purpose. They may be added to the polyvinyl alcohol in amounts such that the sheet does not become too soft for easy handling. Ten percent by weight, for example, of plasticizer has not proved excessive.

The polarizer produced in the manner previously described is an excellent light-polarizer. It may show a transmission of ordinary light exceeding 40% and a percentage polarization of 99.98%. The polyvinyl alcohol polarizer is insoluble in most organic solvents for plastics. It is easily laminated to glass, for example, by the use of plexigum plasticized with dibutyl phthalate or other suitable plasticizer, or by the use of other bonding materials, such as polymerized incomplete polyvinyl acetal or Rogerlite, or many other standard cements and bonding materials. Such a lamination is shown for example in Fig. 1, where 10 represents the polarizing sheet, 12 the adhesive layer and 14 the sheet of glass. It is not affected adversely by contact with the usually employed commercial plasticizers.

While the polyvinyl alcohol polarizer is readily destroyed by water, unless it has been prepared in the preferred manner previously described, it may be, as has been pointed out, easily protected by lamination, as between sheets of glass or plastics, or it may be protected by waterproofing. A lamination of the polarizing material between two sheets of glass is shown in Fig. 2 where 10 represents the polarizing material, 12 the adhesive and 14 the sheets of glass. Its ease of manufacture, its cheapness, and its high efficiency make it of great commercial value.

It is to be understood that while solutions of polarizing polyiodides have been mentioned as preferred in connection with the staining or dyeing of the sheet, dyes may be employed, such as most aniline dyes, and the sheet may be otherwise stained, as by the reduction therein of dissolved metallic salts, or by subjecting the stretched sheet to the action of iodine fumes. In this connection reference should be had to the said copending application Serial No. 237,783 for a more complete discussion of the dyes which may be employed.

While the polarizer of the present invention may preferably be made by the processes heretofore described, modifications of those processes may result in the formation of suitable polarizers, and such modifications are to be deemed to fall within the scope of the invention. For example, a cold, relatively thick sheet or block of polyvinyl alcohol may be suitably stretched before dyeing or staining by drawing the sheet in a predetermined direction across a heated element, such for example as heated glass, which may be positioned in contact with the sheet and which may be heated to a temperature of about 150° C. The heated glass softens the sheet at the place of contact and permits suitable extension.

Many of the dyes or stains suitable in the production of the product of the present invention may be employed to stain the plastic sheet before it is heated and stretched. The dye or stain may even be incorporated with the solution of polyvinyl alcohol prior to the casting or extrusion of the sheet or film, and the polarizer of the present invention may thereafter be formed by heating and stretching the stained or dyed sheet, as hereinbefore described.

While heating and subsequent extension or stretch has been described as the preferred method of effecting orientation of the long molecules of the plastic sheet, it is to be understood that this may be accomplished in other ways. For example, orientation of the molecules may be effected by smearing a viscous solution of the plastic on to a suitable, preferably rigid, smooth supporting surface. When this method is employed to effect orientation of the particles, the viscosity of the solution should preferably be so high that it shows little or no tendensy to flow freely during the smearing process, and it is desirable to continue the process, for example by repeatedly passing the smearing element over the surface of the plastic, until the plastic has dried sufficiently to retain its molecular orientation.

The stain or dye may be incorporated with the plastic prior to the formation of the smeared sheet, or the dried sheet of plastic, for example polyvinyl alcohol, formed by the smearing process described, may be subsequently dyed or stained to produce the polarizer of the present invention.

It has been found that if the polyvinyl alcohol sheet is stretched before it is dyed or stained, its absorption rate of iodine is increased, and where iodine or an iodine compound is employed as the dye or stain, it may be advantageous to first prepare the sheet by heating and stretching.

The stains and dyes described are, when the sheet is in suitably stretched condition, stains for one component only of an incident beam of light. Speaking generally, that component of the incident beam which vibrates parallel to the long axes of the oriented molecules is absorbed, substantially wholly or in part, by the stained sheet, whereas the component vibrating perpendicular to the long axes of the molecules is transmitted by the sheet substantially without absorption.

The polarizing sheet of the present invention is substantially uniaxial. It has its optic axis in the plane of the sheet and it shows little or no absorption for light vibrating perpendicular to its optic axis.

While the specification has described the product of the present invention as a polyiodide of polyvinyl alcohol or as a sheet of molecularly oriented polyvinyl alcohol stained with a dye, or with iodine or a polyiodide, it may be more accurately described as a sorption complex of iodine or polyiodide or other dye on solid polyvinyl alcohol. The polyvinyl alcohol has an oriented structure and the sorption complex is likewise oriented.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. A light polarizer consisting of a sorption complex of a dichroic stain on molecularly oriented solid polyvinyl alcohol.

2. A light polarizer comprising a substantially uniaxial sheet of polyvinyl alcohol having its optic axis in the plane of the sheet and having incorporated therein a substantially oriented dichroic sorption complex of a stain on solid polyvinyl alcohol, said complex being a substantial absorber for light vibrating parallel to its axis, said complex being substantially a non-absorber for light vibrating perpendicularly to its axis.

3. A light polarizer comprising a substantially uniaxial sheet of polyvinyl alcohol having its optic axis in the plane of the sheet and having incorporated therein a polarizing polyiodide adapted to transmit substantially without absorption only that component of an incident beam of visible light vibrating perpendicularly to the optic axis of the sheet.

4. A light polarizer comprising a substantially uniaxial sheet of polyvinyl alcohol polyiodide which has its optic axis in the plane of the sheet and which transmits with substantially no absorption only light vibrating substantially perpendicularly to its optic axis.

5. A light polarizer comprising a sheet of polyvinyl alcohol having its molecules oriented to substantial parallelism and having incorporated therewith a dichroic dye.

6. A light polarizer comprising a sheet of polyvinyl alcohol having its molecules oriented to substantial parallelism and having imbibed therein a polarizing polyiodide.

7. A light polarizer comprising a sheet of polyvinyl alcohol having its molecules oriented to substantial parallelism and having incorporated therewith a dichroic stain comprising iodine.

8. A light polarizer comprising a sheet of polyvinyl alcohol having its molecules oriented to substantial parallelism and having incorporated therewith a water soluble dichroic stain.

9. A light polarizer comprising a sheet of polyvinyl alcohol having its molecules oriented to substantial parallelism and comprising a dichroic sorption complex of a stain on polyvinyl alcohol and laminated to a transparent supporting sheet.

10. A light polarizer comprising a sheet of polyvinyl alcohol having its molecules oriented to substantial parallelism and comprising a dichroic sorption complex of a stain on polyvinyl alcohol and bonded between two glass sheets.

11. The process of forming a light polarizer comprising forming a sheet of polyvinyl alcohol, heating the sheet, stretching the sheet, and forming a polarizing stain therein by forming therein a dichroic complex of a stain on polyvinyl alcohol.

12. The process of forming a light polarizer comprising forming a sheet of polyvinyl alcohol, heating the sheet to a temperature not exceeding 170° C. and at which said sheet softens, stretching the sheet to more than twice its initial length, and forming a polarizing stain therein by staining said sheet at one stage of the process with a dichroic stain.

13. The process of forming a light polarizer comprising forming a sheet of polyvinyl alcohol, stretching the sheet, and forming a polarizing stain therein by staining said sheet with a water soluble dichroic stain.

14. The process of forming a light polarizer comprising forming a sheet of polyvinyl alcohol, stretching the sheet, and forming a polarizing stain therein by staining said sheet with a polarizing polyiodide.

15. The process of forming a light polarizer comprising forming a sheet of polyvinyl alcohol, stretching the sheet, and forming a polarizing stain therein by staining said sheet with a solution containing iodine.

16. The process of forming a light polarizer comprising forming a sheet of polyvinyl alcohol, heating the sheet, stretching the sheet, staining the sheet with a water soluble dichroic stain, and promptly drying said sheet.

17. The process of forming a light polarizer comprising softening a sheet of polyvinyl alcohol by heating the sheet, stretching the sheet to substantially orient its molecules, staining the sheet by forming therein a polarizing complex of a dichroic stain on polyvinyl alcohol to render it light-polarizing, and reheating the sheet to reduce its water permeability.

18. The process of forming a light polarizer comprising preparing a softened mass of polyvinyl alcohol, extending the mass to form a sheet with its molecules oriented to substantial parallelism, and forming in the mass at one stage of the process a polarizing complex of a dichroic stain on polyvinyl alcohol.

EDWIN H. LAND.